Feb. 9, 1960     B. CUTLER     2,924,819
APPARATUS FOR DRIFT COMPENSATION IN AIRCRAFT GUIDANCE SYSTEMS
Filed Aug. 29, 1955     6 Sheets-Sheet 2

INVENTOR.
BURTON CUTLER
BY
Edward J. Kendrick
ATTORNEY

Feb. 9, 1960 B. CUTLER 2,924,819
APPARATUS FOR DRIFT COMPENSATION IN AIRCRAFT GUIDANCE SYSTEMS
Filed Aug. 29, 1955 6 Sheets-Sheet 3

INVENTOR.
BURTON CUTLER
BY
ATTORNEY

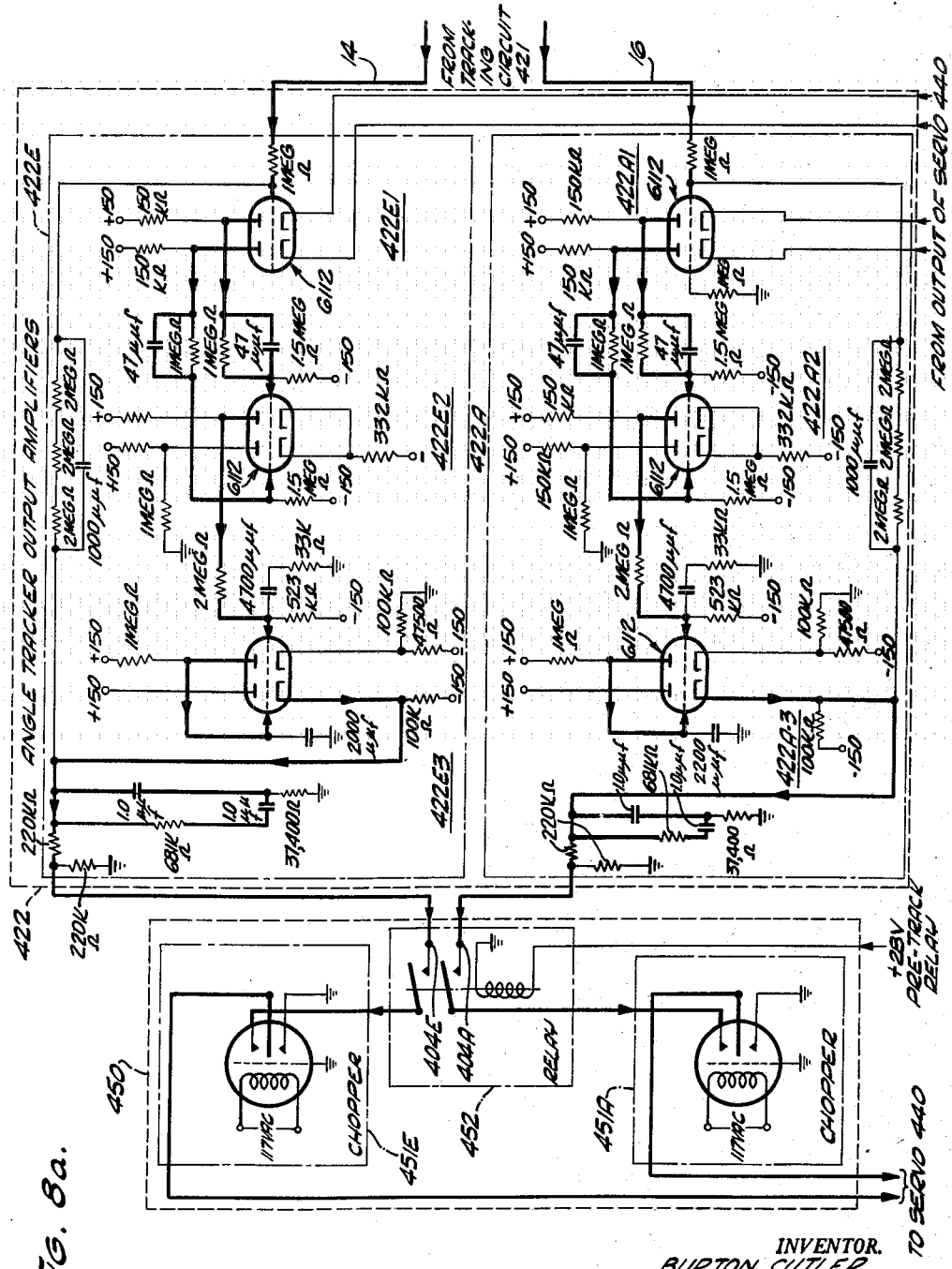

INVENTOR.
BURTON CUTLER
BY
ATTORNEY

United States Patent Office 2,924,819
Patented Feb. 9, 1960

2,924,819

APPARATUS FOR DRIFT COMPENSATION IN AIRCRAFT GUIDANCE SYSTEMS

Burton Cutler, Los Angeles, Calif., assignor to Gilfillan Bros. Inc., Los Angeles, Calif., a corporation of California Application August 29, 1955, Serial No. 530,923

17 Claims. (Cl. 343—11)

This invention relates to means for compensating for the drift normally inherent in an aircraft guidance or navigation system and, more particularly, to an arrangement for calibrating a ground controlled approach (GCA) system or automatic ground controlled approach (AGCA) system prior to its normal searching and tracking operation.

The drift problem occurs in such systems prior to the time that searching begins for an actual aircraft which is subsequently to be guided during a tracking operation. In a particular situation, for example, an outer tracking limit is established, as for example an eight mile limit. A searching operation is then initially performed to detect any object which may pass through this tracking limit for a length of time which indicates the object is an actual aircraft which may desire guidance.

After the initial search detection phase of operation, the aircraft may be guided for a landing approach by tracking it in range through utilization of early-late gates in a well known manner, and by converting the range of the aircraft into a predetermined ideal glide path angle indicating the ideal angle of approach for that range. This ideal glide path angle then is compared with the actual glide path angle of the aircraft as determined by the scanning station in order to produce an error signal corresponding to the amount of departure of the ideal from the actual.

While an attempt will be made herein to describe the various GCA and AGCA components which are subject to drift and to point out the general system operation, reference should be made to copending application Serial No. 265,977 for Range and Angle Tracking of Aircraft Using Angle Gated Video, filed January 11, 1952, by A. G. Van Alstyne and copending application Serial No. 398,288 for Improvements in Ground Controlled Approach System filed December 15, 1953, by H. G. Tasker, et al.

The manner in which a typical AGCA system may drift will be better understood by considering the arrangement of its various components as follows. The typical AGCA system includes a range tracker which begins its normal operation as soon as an aircraft is detected passing through the tracking limit, which may be at 8 miles as pointed out above. As the aircraft approaches the ground station the range tracker produces an output signal continuously representing the range of the target. This signal is applied to an angle function generator which produces signals representing the ideal azimuth and elevation angles for the particular range of the aircraft. The term "ideal" is utilized herein to indicate that the angle signals provided represent the most desirable glide-path angles for a particular aircraft range.

It will also be assumed in order to illustrate the drift problem that the system operates on the track-while-scan principle wherein each radar scanning antenna is oscillated through its respective scanning angle during the tracking operation. Typically then each antenna, for azimuth and elevation, has associated with it an angle coupling unit which produces a signal indicating the instantaneous angular position.

The first angle signal representing the actual aircraft angle, as determined by the signal produced by the angle coupling unit, is then compared to the second angle signal derived through the computing operation of the function generator. The difference between these two signals may then be referred to as an error signal which effectively represents the angular displacement of the aircraft from the desired flight path angular position.

It should be noted here that this error signal may be employed in either an AGCA or GCA system as means for indicating a computed error which may be relayed through a radio link to the pilot. It should also be noted that the error signal is really a composite signal since elevation and azimuth scanning is performed on a time shared basis.

The range and angle trackers may be utilized to produce various error signals relating to a plurality of different channels where each channel is associated with the tracking of one aircraft.

It should be apparent that in the typical system just described many of the component parts are subject to drift. Thus prior to the actual tracking operation of such a system the range tracker, the glide path function generator, the angle coupling unit, and the angle tracker may all be in a state of departure from the desired initial condition for the proper operation during track.

Previous attempts have been made to prevent drift of this type and typically have employed servo mechanism devices such as the chopper stabilized direct-current amplifier. While such devices may be utilized satisfactorily to compensate for the normal drift errors they become impractical in a multi-channel system where a plurality of aircraft must be accurately tracked due to the system complexity which would result. Thus for example in a representative AGCA system six tracking channels are included and each would require four drift compensating servo amplifiers for a total of 24 such circuits.

This type of arrangement is not only undesirable from the point of view of the complexity involved but also due to the inherent inaccuracy of each of the servo devices itself.

In the first place it may be noted that each servo requires an accurate standard from which it may operate. In other words each may require a reference potential such as ground to indicate a zero condition.

Even if it is assumed that this standard is readily available it cannot necessarily be assumed that the standard itself may not drift. Thus some drift may exist in each of the servo mechanism circuits and the cumulative effect of the drift in all of the various components may still cause the channel to produce an erroneous signal and thus to operate unsatisfactorily.

The drift problem becomes more important as greater accuracy is required from the system. Thus where a landing system is contemplated which typically may control the approach of an aircraft from an altitude of 40 feet or less, a small amount of drift may nevertheless mean an error of several feet which may prevent proper guidance of the aircraft to the ground. The features of the present invention then become particularly important in such a landing system.

The above and other disadvantages of the prior art with respect to system drift prior to actual operation are overcome in accordance with the principles of the present invention by means of a simulated operation which may be considered to include pre-search and pre-track conditions. According to the present invention a reference range signal is produced proportional to the range of a simulated aircraft known to be positioned at a predetermined point on the ideal glide path at a particular scanning angle. This reference signal then is applied to the range tracker which is actuated to operate in its normal manner to produce the computed angle signal.

The computed angle signal and the antenna scan angle signal are then compared in the normal manner to produce the error difference signal. A feedback loop is provided in accordance with the invention where the error signal may be considered to be an input signal and a feedback coupling is provided which will reduce this signal to zero.

In this manner then the invention provides a method and corresponding means for simulating an aircraft at a known position on the predetermined flight path or glide line; and then initially stabilizes the entire system in what may be referred to as a zero calibration state prior to tracking so that regardless of the separate drift conditions of each of the means it is known that the error signal output is zero, as it should be where the target is on the glidepath.

The same type of precalibration operation may be performed for any number of channels and consequently it is contemplated that in accordance with the teachings of the invention each channel is operated in a simulated pre-search and pre-track phase before the actual search and tracking operations begin. Thus certain channels may be stabilized in this manner for a considerable time during which time they are effectively operated to track a simulated known target.

It should be apparent then that a multitude of disassociated servo control mechanisms are not required, as has been previous practice, and further that the simulated tracking operation provided by the invention serves to compensate for all drift in the various components without the necessity of a separate stabilization device for each.

In accordance with the invention simulated pulse echoes are produced which are delayed with respect to the normal system trigger signals by amounts corresponding to the pulse return time of echoes from an aircraft known to be at a predetermined point on an ideal glidepath. These simulated pulse echoes then are applied to the range tracker through what may be referred to herein as a programming device. A pre-search actuating signal is also applied to the range tracker by the programming device. The range tracker then operates in its normal manner so that as soon as the simulated target "appears" to pass through the search range limit it enters into a tracking operation referred to as pre-tracking in order to distinguish it from the normal tracking operation.

If the range tracker is operating properly the pre-tracking operation causes it to produce a substantially constant range signal corresponding to the range of a "simulated" aircraft on the ideal glidepath. This range signal then is converted in the usual manner to a computed angle signal and at the same time an antenna scanning signal is produced.

The computed angle signal and the antenna scanning signal are compared in the usual manner to produce the error signal but a modification is introduced in the operation, in accordance with the method of the invention, whereby this error signal is converted in to a feedback control signal for varying the error signal until it becomes zero.

In this manner then the error signal is initially stabilized at a known reference value, which conveniently may be zero, so as to represent the known error when the simulated aircraft is on the glidepath. It should also be noted that this error correction function is done in a manner which sets up initial condition parameters so that in the subsequent tracking operation which follows any error signal which is generated is produced as a function of the previously established initial conditions.

In accordance with one technique contemplated by the invention the reference signal for the simulated aircraft is produced by delaying the trigger signals of the system, where each trigger signal indicates the time that a radar pulse is transmitted through one of the scanning antennas. The trigger signals are delayed by an amount corresponding to the expected pulse echo time for a simulated target at a predetermined range point. In a particular case this range may conveniently be the touchdown range which is the distance from the scanning station to the point where the glidepath intersects the runway.

The means for delaying the trigger signals then provides a delayed output pulse which is applied to a gating circuit receiving an angle blanking signal. The angle blanking signal may be obtained through a blanker switch and indicates angle limits surrounding the predetermined point on the glidepath. In other words the blanking signal is utilized to activate the gating circuit during the period of the system operation when the antennas are directed toward the "simulated" target. While this ype of angle gating is not absolutely required during the pre-tracking operation it is preferred in that it helps eliminate spurious pulses which may appear to be the "simulated" target. Such spurious pulses could cause the range tracker to lose the simulated target.

Another technique which may be employed to provide the simulated echoes is the provision of radar reflectors, two of which may be positioned to simulate a single reflection from a predetermined point on the glidepath, again which may be conveniently made to exist at touchdown. According to this technique then no additional circuit means are required during the pre-tracking period since the normal scanning operation of the radar antennas will detect the echoes of the radar reflectors. It may be desirable again however to gate these echoes by means of the antenna blanking signal.

Another important feature of the invention is a technique of programming the range tracker operation so that it may be led into the simulated tracking operation without causing any spurious transient signals and further without the necessity of providing an accurately regulated range signal. The reason the problem is somewhat difficult is that in the normal operation of the range tracker the tracking limit, or 8-mile signal, is quite accurately limited so that the tracking operation will begin only while the aircraft crosses this range. Thus the range tracker is quite sensitive and would not go into operation unless it appeared that a target, whether real or simulated, was passing through the established range limit.

In the case of the simulated aircraft then the standard tracking technique would necessitate the establishment of a range limit at a predetermined point on the glide path, as for example at touchdown, and that this range signal be accurately maintained throughout the drift compensation period of pre-tracking. In a sense such an attempt would defeat the basic purpose of the invention, namely to eliminate the effect of drift due to variations in signal regulation.

Furthermore if a pre-tracking operation were suddenly initiated the target would effectively jump to the range limit desired and would cause transients. It would be as if the target appeared from nowhere and suddenly was at the range where tracking should begin.

Accordingly, it is contemplated in accordance with the invention that a varying amplitude range simulating signal be produced where the signal amplitude variation occurs in boundaries which surround the range of the predetermined point on the glidepath, such as the touchdown point. In a particular practice of the invention an exponentially varying signal may be employed which is selected so that the signal variation is slight in the range of the predetermined point. This varying amplitude range simulating signal then is applied to the range tracker during what is referred to as the pre-search phase of operation and effectively causes the "simulated" target echoes to move toward the scanning station.

Thus in this manner a gradual transition may be made into the pre-tracking operation without causing any system transients, and it is not necessary to provide an accurately regulated range signal representing the predetermined point. Furthermore, once the range tracker detects the simulated target in the range limit area it automatically stabilizes itself to produce the desired range signals.

Another very important feature of the invention is the provision of an output amplifier stage which may be associated with the angle tracker of an AGCA system where the output amplifier stage includes a variable biased device which may be set in accordance with predetermined initial conditions. This stage then normally receives an input signal corresponding to the angle error and produces an error representing signal. As pointed out above the error representing signal corresponds to drift in the system during the calibration stage of operation. This error or drift representing signal then is converted to a servo input signal which conveniently may be accomplished by means of a chopper stage providing an A.C. output signal having an amplitude corresponding to the error signal.

The servo input signal then drives a servo mechanism which may be mechanically linked to the means for varying the bias setting the system initial condition. In this manner then the servo mechanism is driven as long as any input signal appears and varies the bias conditions of the amplifier stage until the output signal thereof represents the predetermined initial condition.

Accordingly it is an object of the present invention to provide drift compensation means for an air navigation system, without the necessity of a complexity of servo stabilization means, such means being also subject to drift.

Another object is to provide means for stabilizing an aircraft guidance system during a pre-tracking period so that it may be free of drift errors during the actual tracking operation.

A further object is to provide apparatus for calibrating a ground-controlled approach system by actuating it to track a simulated aircraft appearing to be positioned at a point on a predetermined flight path.

Yet another object is to provide apparatus for actuating a range tracker device into a pre-tracking operation where it functions in its normal manner but produces a range signal representing the position of a simulated target, the technique employed being designed to prevent unwanted system transients and the necessity for providing accurately regulated range-representing signals.

Yet a further object of the invention is to provide an output stage for an angle tracker utilized in a ground-controlled approach system and means associated therewith for setting the output stage at a predetermined initial condition based on the tracking of a known target.

A more specific object is to provide a drift compensating device for utilization in an aircraft guidance system where the system is stabilized to prevent drift during a pre-tracking operation by causing the system to track a simulated aircraft apparently positioned at a known point on an ideal glide path, the normal aircraft departure error signal being utilized to control a servo circuit which in turn establishes certain predetermined initial conditions which are free of drift.

Another specific object of the invention is to provide means for calibrating an aircraft guidance system wherein the system trigger pulses are delayed to produce target simulating pulses conveniently representing a target at touchdown, the system being then made to stabilize itself prior to operation in tracking the simulated target.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figs. 8a and 8b are schematic diagrams of a servo mechanism shown in Fig. 1.

Figure 1:
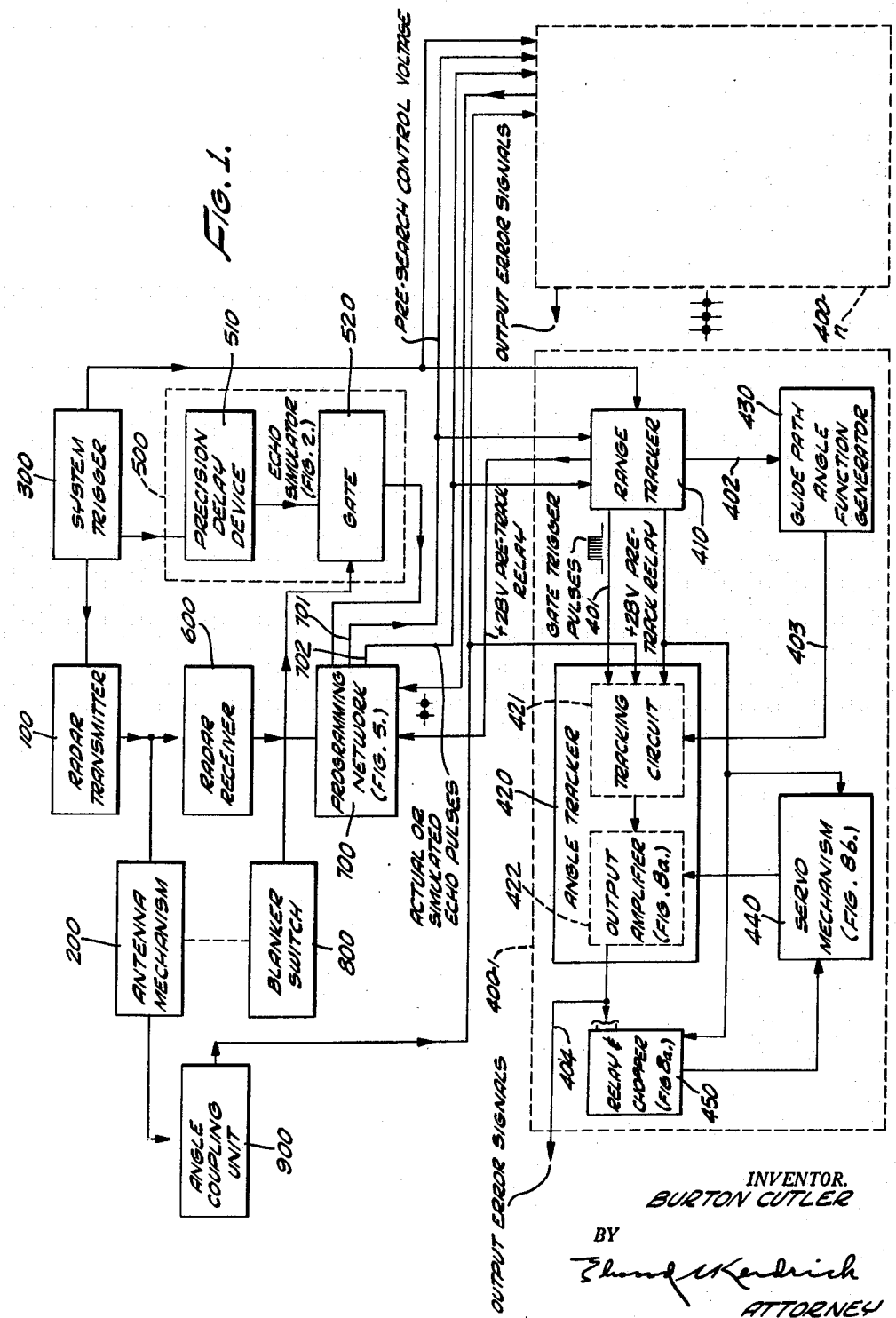
Fig. 1 is a block diagram of the air navigation system of the present invention.

In the drawing in Fig. 1 an air navigation system is shown in block diagram form comprising a radar transmitter 100 which is coupled to an antenna mechanism 200 to transmit microwave pulses in response to trigger pulses applied to the radar transmitter 100 by a system trigger 300. Trigger 300 is, in turn, coupled to a plurality of aircraft tracking channels 400-1 ... 400-n and an echo simulator 500 which includes a precision delay device 510 which is coupled from the system trigger 300 to a gate 520.

The air navigation system shown in Fig. 1 is provided with a radar receiver 600 and a programming network 700. A blanker switch 800 is mechanically connected to the antenna mechanism 200 to operate the gate 520 of echo simulator 500 at a time when the azimuth and elevation antennas are directed toward touchdown during their respective scans.

Programming network 700 is coupled from radar receiver 600 and gate 520 of echo simulator 500 to a range tracker 410 in the tracking channel 400-1. Programming network 700 thus selectively introduces the output pulses of radar receiver 600 or of gate 520 to range tracker 410, depending upon the condition in which the tracking channel 400-1 happens to be. In addition, programming network 700 operates a time modulator in the range tracker 410 to cause the range tracker 410 to search for a target echo near touchdown which is simulated by the echo simulator 500.

In the tracking channels 400-1 an angle tracker 420 is connected to a range tracker 410. In order that the angle tracker 420 may be provided with information concerning the ideal glide path angle of a target being tracked, a glide path angle function generator 430 is connected between range tracker 410 and a tracking circuit 421 of angle tracker 420 to produce a tracking circuit output signal that is passed through an output amplifier 422 of angle tracker 420 to provide output error signals which may be coded and transmitted to the glide path receiver of an aircraft being tracked.

In order to produce output error signals the angle tracker 420 in the tracking channel 400-1 must be provided with an indication of the actual angular position of an approaching aircraft. To this end, an angle coupling unit 900 is electrically connected from antenna mechanism 200 to the angle tracker 420 of tracking channel 400-1, and more specifically to the tracking circuit 421 of the angle tracker 420.

In order to compensate for or minimize the drift in the components of the air navigation system shown in Fig. 1 while the tracking channel 400-1 is in a standby or semi-standby condition, the range tracker 410 of the tracking channel 400-1 is caused to search for echoes of a target at touchdown which are simulated by echo simulator 500.

When the range tracker 410 "finds" the touchdown target then the range tracker operates a pre-track relay in the angle tracker 420 and in a servo mechanism 440 in the tracking channel 400-1 and further provides an envelope of the simulated echoes to cause tracking circuit 421 of angle tracker 420 to sample the output signal amplitudes of angle coupling unit 900 and of glide path function generator 430 at times when the antennas of the antenna mechanism 200 are directed toward touchdown.

A relay and chopper stage 450 are connected from the output side of output amplifier 422 to servo mechanism 440. The 28 volt pre-track relay signal produced by range tracker 410 is employed to energize the relay of stage 450.

The servo mechanism 440 is connected from the stage 450 to the output amplifier 422 of the angle tracker 420. The output amplifier 422 of the angle tracker 420 may incorporate a differential amplifier on which a fixed bias may be changed to cause the output error signals to be zero when range tracker 410 is caused to track the simulated echoes of a target at touchdown.

It is seen that the programming network 700 is modified to selectively introduce the output pulses of radar receiver 600 and gate 520 to range tracker 410 and that range tracker 410 is modified to energize pre-track relays in angle tracker 420 and stage 450. In accordance with the invention the echo simulator 500 and servo mechanism 440 are additionally connected to an otherwise conventional ground-controlled approach or landing system to minimize component drift over an extended period when a tracking channel 400 is in a standby or semi-standby condition.

In the operation of the air navigation system shown in Fig. 1, the system trigger 300 provides output voltage pulses which are passed through precision delay device 510 of echo simulator 500. The delayed voltage pulses appearing at the output of precision delay device 510 are then passed through programming network 700 to the range tracker 410 of the channel 400-1. Programming network 700 thus contains a relay which is energized manually to cause the system of Fig. 1 to go into the pre-search condition. Gate 520 of echo simulator 500 then is employed to pass the delayed pulses of precision delay device 510 when the antenna of the mechanism 200 is directed toward touchdown. Blanker switch 800, in fact, operates gate 520 whenever the antenna mechanism 200 is directed for a touchdown.

The pulses appearing at the output side of the gate 520 are then passed through programming network 700 to range tracker 410. Range tracker 410 of tracking channel 400-1 must be put in the pre-search condition; this is manually accomplished through the switching provided in programming network 700 which may be manually operable. The connection between programming network 700 and range tracker 410 for initiating pre-search is indicated at the lead 701 appearing at the output side of programming network 700. The delayed pulses appearing at the output side of gate 520 are then passed to range tracker 410 through a lead 702 appearing at the output side of programming network 700. The voltage obtained at lead 701 then controls the time modulation of pulses entering range tracker 410 by controlling the bias voltage on the time modulator of the range tracker 410.

When the pre-search control voltage appearing at lead 701 is of a sufficiently low amplitude, range tracker 410 then starts to track the gated trigger pulses appearing at lead 702 at which time angle tracker 420 is operated by gated trigger pulses the envelope of which is detected by range tracker 410 and impressed upon the tracking circuit 421 of angle track 420 over a lead 401. At this time a range voltage proportional to the range of a target at touchdown appears at the lead 402 at the output of range tracker 410 connected to glide path angle function generator 430. This causes glide path angle function generator 430 to produce an output voltage proportional to the ideal glide path angle of an aircraft at touchdown. This voltage is impressed upon a lead 403 at the output of glide path angle function generator 30 which is connected to the tracking circuit 421 of angle tracker 420.

Angle coupling unit 900 produces an output voltage proportional to the position of the azimuth and elevation antennas of the antenna mechanism 200 and this voltage is impressed also upon the tracking circuit 421 of angle tracker 420. The continuously varying voltage appearing at the output of angle-coupling unit 900 is then sampled at times when the gated trigger pulses appearing at lead 401 are received by the tracking circuit 241 of angle tracker 420. Thus a continuously varying function of time is generated which simulates the actual azimuth and elevation angles of an aircraft at touchdown. These are compared with the ideal angles, voltages proportionate to which are impressed upon lead 403 by glide path angle function generator 430, lead 403 being connected to the tracking circuit 421 of angle tracker 420.

Output amplifier 422 of angle tracker 420 is employed to produce output error signals on an output lead 404 proportionate to the error in the pitch and bearing of an aircraft at touchdown, i.e., an aircraft simulated by the echo simulator 500. Of course the error signals appearing at lead 404 should be zero when the tracking channel 400-1 tracks the simulated echoes of echo simulator 500. The precision delay device 510 delays the system trigger pulses an accurate amount of time, whereby if all the components in the system are operating properly and without drift, the output signals appearing at lead 404 will be zero. However, the angle coupling unit 900, the range checker 410, the glide path angle function generator 430, and the angle tracker 420 are all subject to drift when the system of Fig. 1 is put in the standby condition. Hence it is desirable to continuously compensate for the drift in the above-mentioned elements while the system is in the stand-by condition, i.e, the drift in the elements should be continuously compensated for during the time just preceding the time when the range tracker 410 "looks for" an aircraft at the limiting distance of the system during normal search.

Accordingly, servo mechanism 440 is employed to detect the output signal amplitude of the output amplifier 422 at lead 404 and to reduce the amplitude of this signal to zero when the system is in a pre-track condition. Servo mechanism 440 is employed to accomplish this result because the output error signals appearing at lead 404 should in fact be zero when the system is in a pre-track condition because the gated trigger pulses received by the range tracker 410 are precision delayed by the precision delay device 510. Since they are precision delayed, the range tracker 410 receives trigger pulses delayed an exact amount of time proportional to the distance between the antenna mechanism 200 and touchdown.

Figure 2:
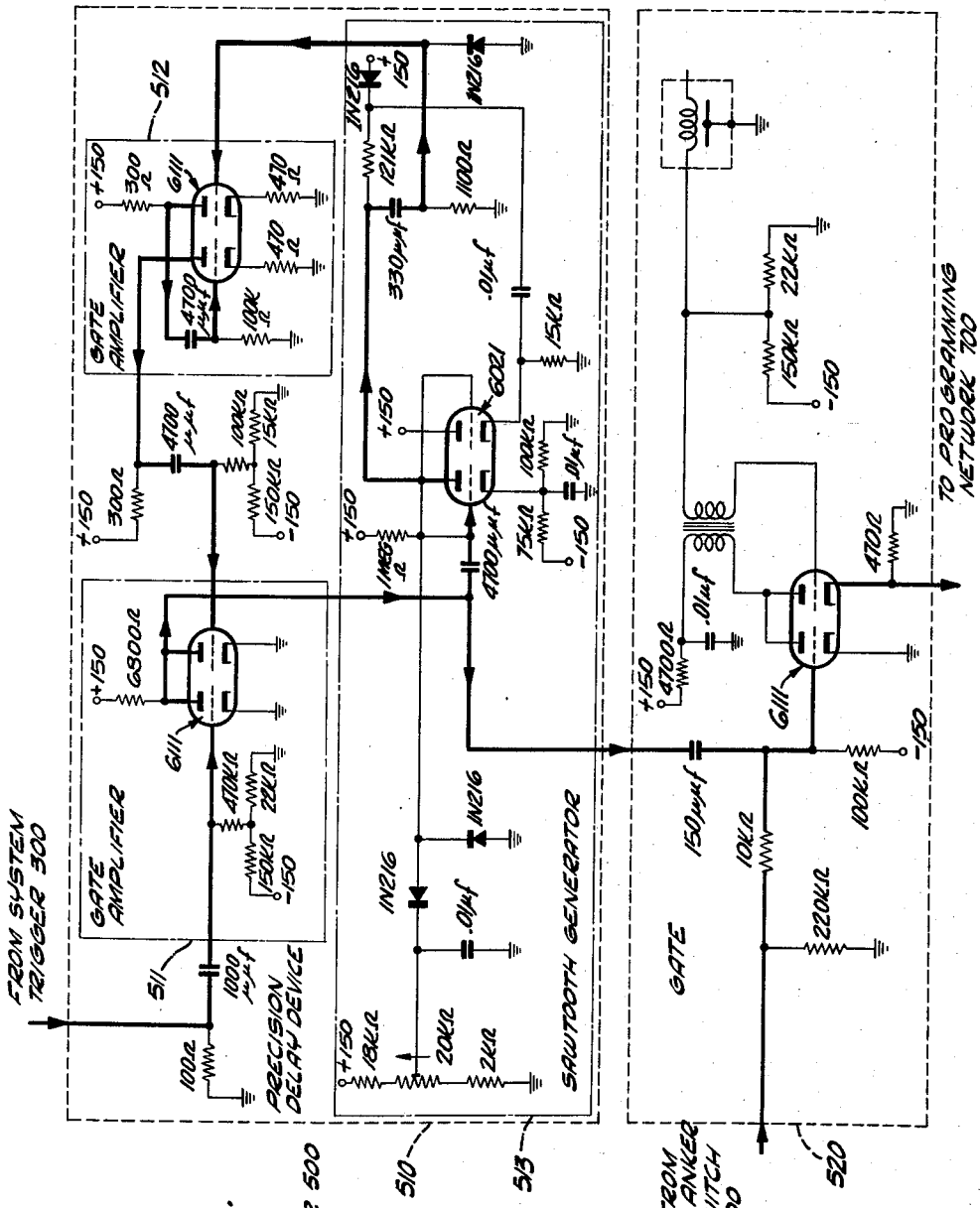
Fig. 2 is a schematic diagram of a pulse echo simulator shown in Fig. 1.

Echo simulator 500 is shown in Fig. 2 including the precision delay device 510 and the gate 520. The system trigger 300 is impressed upon precision delay device 510 and the output of the precision delay device 510 is a sawtooth which operates a blocking oscillator in the gate 520. The output signal amplitude of the saw-tooth generated in the precision delay device 510 is then stepped up according to the amplitude of the output signal from the blanker switch 800 which is impressed upon gate 520. Precision delay device 510 includes two gate amplifiers 511 and 512 which are well-known in the art and a sawtooth generator 513 which is also well known in the art. The blocking oscillator of gate 520 is also conventional.

Figure 3:
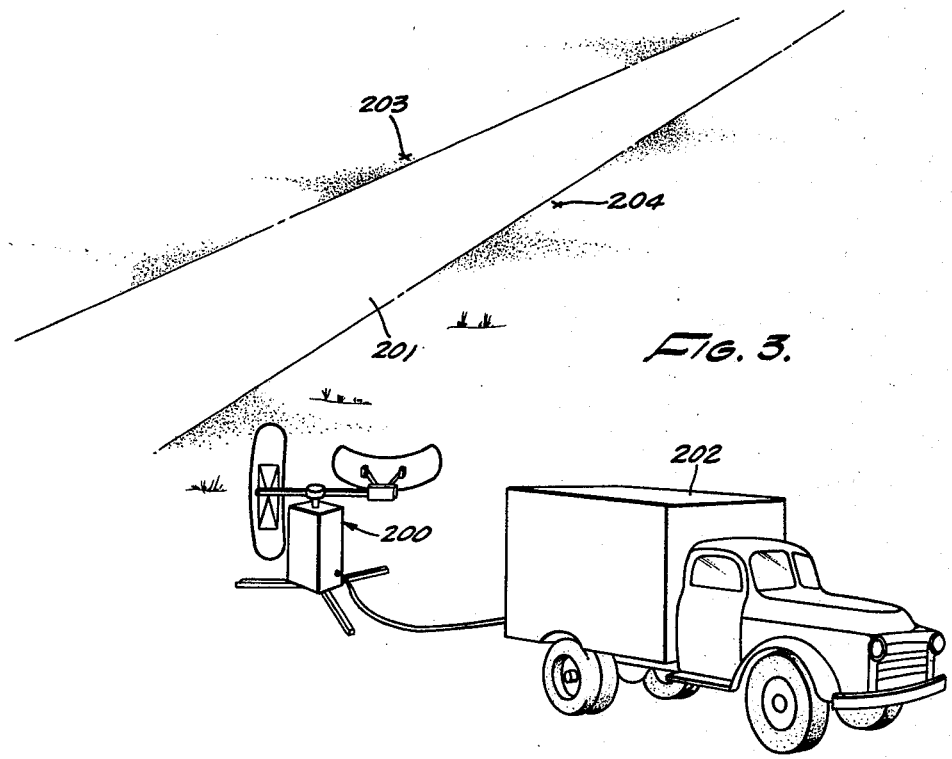
Fig. 3 is an isometric view of an AGCA or GCA system near an airstrip.
Figure 4:
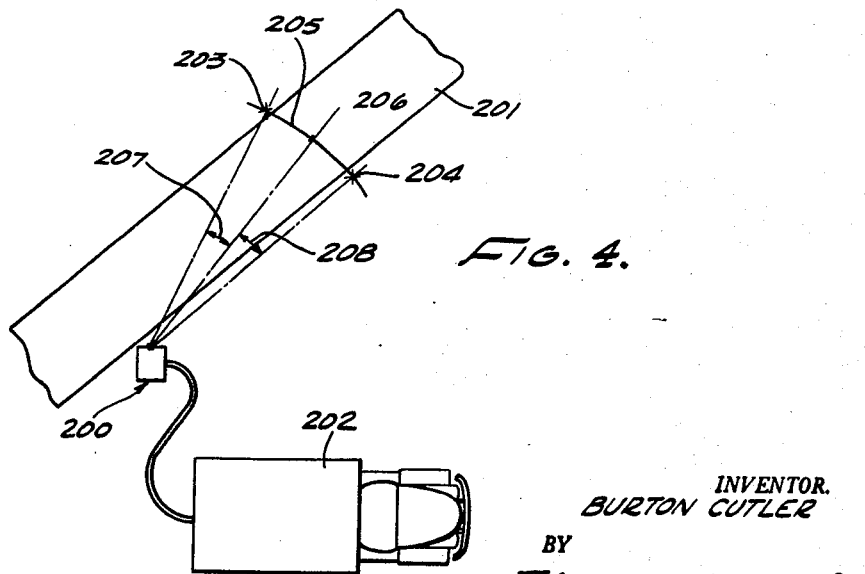
Fig. 4 is a diagrammatic plan view of the positions of the system and airstrip shown in Fig. 3.

Alternatively conductive corner reflectors may be employed to simulate an aircraft at touchdown. Generally, it may be desirable to place a reflector say two feet off of the ground. If a reflector is then placed at touchdown it might interfere with the flight path of a moving aircraft. For this reason a special adaptation may be required. Such an adaptation is illustrated in Figs. 3 and 4 where the antenna mechanism 200 is shown positioned beside an airstrip 201 and connected to the remaining equipment of an AGCA or GCA system, not shown, which is housed in a truck 202 provided for that purpose. In Fig. 4 corner reflectors may be positioned at two crosses 203 and 204 which lie on an arc 205 passing through a touchdown point indicated by 206. Two angles 207 and 208 from touchdown to the crosses 203 and 204, respectively, are equal. When the blanker pulses from blanker switch 800 are made long enough to include reflections from both reflectors 203 and 204, then these reflections may be averaged and the true range of an aircraft at touchdown simulated by the delayed reception of transmitted pulses.

Figure 5:
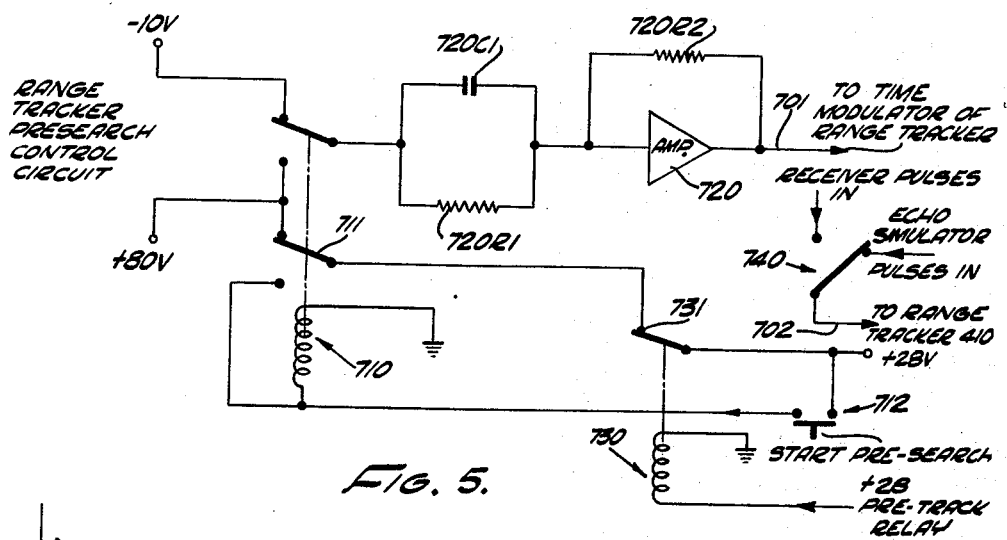
Fig. 5 is a schematic diagram of a portion of a programming network shown in Fig. 1.

A single pole, double throw switch 740 is shown in Fig. 5 which is a portion of the programming network 700 which alternatively connects the receiver 600 or the echo simulator 500 to the range tracker 410 of tracking channel 400–1. The switch 740 may be, for example, a toggle switch.

A portion of programming network 700 is also employed to control the time modulator of the range tracker 410. This portion is shown in Fig. 5 comprising a pre-search relay 710 having self-locking contacts 711 operative from a positive 28 volt source through a manually operable switch 712. Relay 710 is employed to connect the input side of an amplifier 720 from normally a minus 10 volt source to a plus 80 volt source. Amplifier 720 is provided with a series input resistor 720R1 which is provided with a parallel connected capacitor 720C1. Amplifier 720 is also provided with a parallel connected feedback resistor 720R2 whereby the output voltage appearing at lead 701 of the amplifier 720 is an exponentially decaying voltage which starts decaying at the energization of pre-search relay 710.

A track relay 730, which receives an output signal from range tracker 410 when range tracker 410 goes into the track condition, is employed to break two normally closed contacts 731 which are in series with the normally open contacts 711 which self-lock pre-search relay 710. Thus when the range tracker 410 goes into the track condition the portion of the programming network 700 shown in Fig. 5 is then disabled since range tracker from that time forward tracks the gated trigger pulses received through programming network 700 from gate 520 without the aid of any other modification of the conventional system shown in Fig. 1. This may be explained further in that the range tracker 410 simply tracks the simulated echoes of echo simulator 500 in the normal manner as though an aircraft actually appeared at touchdown.

Figure 6:
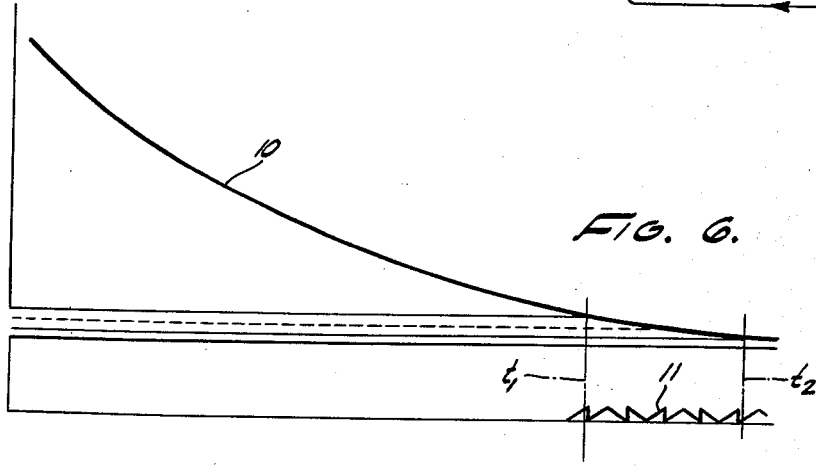
Figs. 6 and 7 are graphs of wave forms typical of the operation of the air navigation system shown in Fig. 1.
Figure 7:
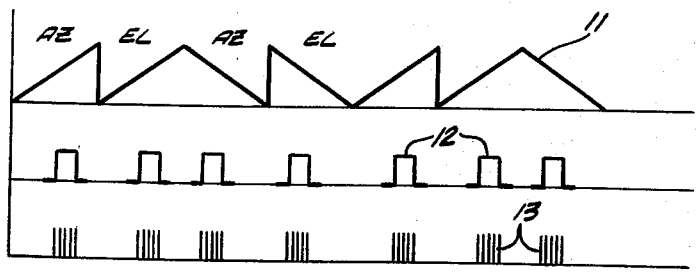

Waveforms typical of the operation of the circuit of Fig. 5 and of other circuits shown in Fig. 1 in block diagram form are illustrated in Figs. 6 and 7. In Fig. 6 the exponentially decaying curve 10 is shown illustrating the time variation of the voltage appearing at the lead 701, i.e., the pre-search control voltage of range tracker 410. Typically blanker switch 800 operates gate 520 of echo simulator 500 only during one-quarter to one-third of the sweep time of a single sweep of an azimuth or elevation antenna of the antenna mechanism 200. Consequently it is necessary to cause the voltage impressed upon the time modulator of range tracker 410 to be near touchdown voltage a substantial length of time. This is true also because the time modulator has early and late gates which operate over a severely limited time interval. For example, the time $t_1$ may be the time modulator is able to "see" a target near touchdown represented by the delayed echoes of echo simulator 500. If after the time $t_2$ the time modulator of the range tracker 410 no longer is able to "see" the target echoes of echo simulator 500 representing the appearance of an aircraft at touchdown, then $t_2-t_1$ is the time in which range tracker 410 must go into the pre-track condition.

If the blanker switch operates during 25 percent of the time of a single scan of an azimuth or an elevation antenna of the antenna mechanism 200, then $t_2-t_1$ must equal about four times the time for a single azimuth scan plus four times the time for an elevation scan. This is true in that there will not be a coincidence of the amplitude of the exponential curve 10 with the touchdown voltage which range tracker 410 is capable of tracking because of the narrow time width of the early and late gate pulses of range tracker 410. Further, the range tracker 410 cannot "look" at the gated trigger pulses received from the echo simulator 500 except at a time when the blanker switch 800 is operated. Then the time difference $t_2-t_1$ must be at least four times the time for a single scan of the elevation antenna of the antenna mechanism 200 plus four times the time for a single scan of the azimuth antenna of the antenna mechanism 200. The time from zero time as indicated in the graph of Fig. 6 to the time $t_2$ may be for example 15 seconds and the time for a single azimuth scan may be equal to the time for a single elevation scan. The antenna scanning times may be, for example, 0.25 second.

The azimuth and elevation antenna scans are usually made on a time shared basis. This is indicated by the combination of saw-tooth voltages represented by the waveform 11, shown in Fig. 6. The curve 11 is shown in Fig. 7 with an expanded time base, the correspondence of the output pulses of blanker switch 800 are indicated by the pulses 12 shown directly below the expanded curve 11 representing the output voltage of angle coupling unit 900. During the time the blanker pulses 12 are employed to operate the gate 520 of echo simulator 500, the gate 520 passes a plurality of system trigger pulses indicated at 13 directly below the blanker switch pulses 12 of Fig. 5. The trigger pulses 13 are then received by the range tracker 410 through programming network 700.

Figure 8B:
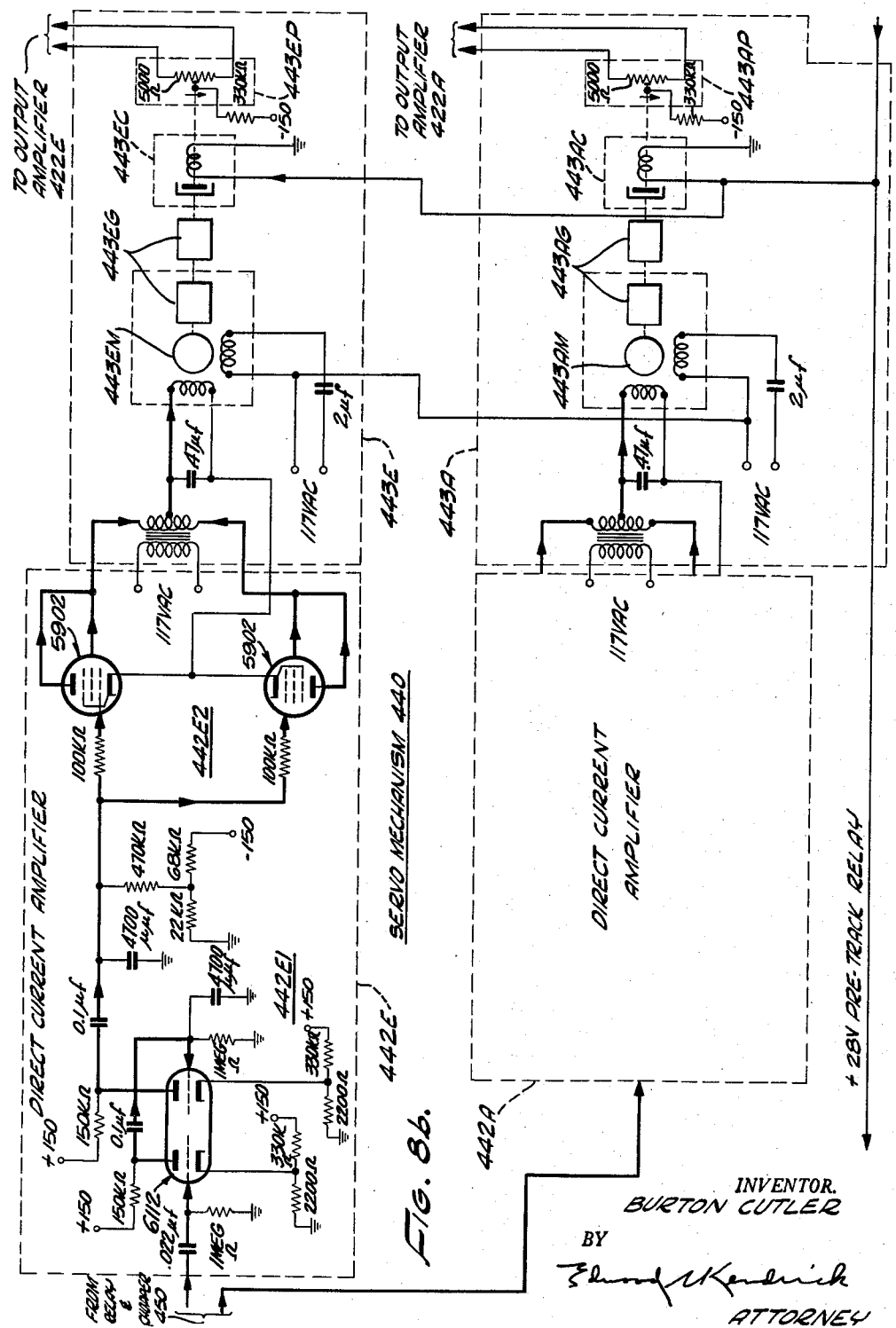

The servomechanism 440 of Fig. 1 is shown in Figs. 8a and 8b. In Fig. 8a the output amplifier 422 of angle tracker 420 is shown including an elevation output amplifier 422E and an azimuth output amplifier 422A. The output amplifiers 422 are additionally provided with intermediate amplifiers 422E2, 422A2 and output amplifier and cathode follower output stages 423E3 and 422A3 which is conventional. The amplifiers 422 are connected respectively to relay and chopper stage 450 including an elevation input chopper 451E and an azimuth chopper 451A. The output amplifiers 422 are connected to the choppers 451 through a relay 452 which is operated in response to the reception of a tracking signal from the range tracker 410 of the tracking channel 400–1. This tracking signal may be the plus 28 volt signal called the pre-track signal. The pre-track signal signifies that range tracker 410 has gone into the pre-track condition. It is at this time also desirable to operate the servomechanism 440. This is accomplished partially by the energization of relay 452.

Inputs to the output amplifiers 422 are provided on input leads 14 and 16, the leads on which voltages proportionate to the angle error signals produced by tracking circuit 421 are impressed. The output amplifier 422E is provided with an input differential amplifier stage 422E1 to which the output of servo-mechanism 440 is connected for adjusting the error signal amplitude appearing at lead 14 to a value to cause the signal at the output side of the output amplifier 422E appearing at 404E to be zero when range tracker 410 tracks the touchdown signal of echo simulator 500. This is likewise true of the output signal of output amplifier 422A where an azimuth error voltage is impressed upon input lead 16 and the output of an input differential amplifier 422A1 is varied by a connection from the output side of servomechanism 440. The output signal of output amplifier 422A appears at a lead 404A. By the operation of servomechanism 440, the output error signal appearing at lead 404A is reduced to zero when range tracker 410 tracks the simulated echoes of a target at touchdown produced by echo simulator 500.

The error signals appearing at the leads 404E and 404A at the output sides of amplifiers 422 are chopped by the choppers 451 and are fed to direct current amplifiers 442E and 442A as shown in Fig. 8b. The amplifier 442A may be identical to that of amplifier 442E which comprises an input amplifier stage 442E1 and an output amplifier stage 442E2. Output amplifier stage 442E2 is transformer coupled to a motor driven potentiometer circuit 443E, amplifier 442A having a corresponding motor driven potentiometer circuit 443A. The circuits 443 are identical as was the case with amplifiers 442.

Motor driven potentiometer circuit 443E comprises a motor 443EM, consecutive gear reducers 443EG, an electro-magnetic clutch 443EC, and an output potentiometer 443ET. Both motor-driven potentiometers circuits 443 employ electro-magnetic clutches 443EC and 443AC, whereby the motors 443EM and 443AM may be disconnected from the respective potentiometers 443EP and 443AP of the motor-driven potentiometer circuit 443 when the tracking channel 400 of this system shown in Fig. 1 goes into the normal search.

The pre-track signal of plus 28 volts from the range tracker 410 is employed to actuate the electromagnetic clutches 443EP and 443AP. The output sides of potentiometers 443EP and 443AP are then connected to the cathodes of the differential amplifiers 442E1 and 442A1 shown in Fig. 8a in the output amplifiers 442 of angle tracker 420.

After the pre-search control voltage supplied by the programming network 700 over the lead 701 causes range tracker 410 to go into the pre-search and subsequently into the pre-track condition, the error signals appearing at leads 14, 15, 404E and 404A should be zero since the range tracker 410 is employed to track the exact simulated echoes of an aircraft at touchdown provided by the echo simulator 500. However, the output signal amplitudes of the output amplifiers 420 and the corresponding input signals will not always be zero due to the drift in the equipment of the system shown in Fig. 1. The outputs of amplifiers 422 appearing at leads 404E and 404A are then chopped up by the choppers 451 and amplified in amplifiers 442. Amplifiers 442 are, in turn, employed to drive a motor-driven potentiometer circuit 443 to change the balance of the differential input amplifiers 422E1 and 422A1 of the output amplifiers 422, whereby the output signal amplitude of the voltages appearing on leads 404E and 404A at the output sides of the amplifiers 422 may be reduced to zero.

It is thus evident that drift compensation means are provided in an air navigation system by the present invention without the need for complex servo stabilization devices which may also be subject to drift. The device of the invention also provides means for tracking a simulated aircraft appearing to be positioned on an ideal flight path. Additionally, the invention provides apparatus for actuating the range tracker in an AGCA or GCA tracking channel without producing unwanted transients.

What is claimed is:

1. In an air navigation system where a first signal is produced which is representative of the angular position of a scanning antenna and a second signal is produced which is representative of the ideal guide path angular position of an aircraft at its particular range, the combination comprising: first means for producing a reference signal proportional to the range of a simulated aircraft positioned at a predetermined point on the ideal glide path; an angle tracker for deriving an initial error signal substantially proportional to the difference between the first and second signals at a time when the antenna is directed toward said predetermined point; and a servo mechanism responsive both to a programming signal and to said initial error signal for calibrating the system for subsequent angle error indication by introducing a servo control signal to said angle tracker to reduce said initial error signal to zero.

2. The invention as defined in claim 1, wherein said first means includes pulse delay means, a gating circuit, and an aircraft range tracker, said pulse delay means being coupled to said range tracker through said gating circuit.

3. The invention as defined in claim 1, wherein said first means includes a radar transceiver and an aircraft range tracker coupled thereto, and a reflector system spaced from said transceiver to produce pulse echoes delayed a length of time proportional to the range of said simulated aircraft.

4. The invention as defined in claim 3, wherein said reflector system comprises two electromagnetic wave reflectors disposed equidistant from said predetermined point and at a distance from said transceiver equal to the distance from said transceiver to said point.

5. In an aircraft guidance system wherein first and second angle signals are employed respectively to represent an actual aircraft angular position referenced to a scanning station, and the desired angular position of the aircraft specified in accordance with a predetermined flight path, the system including means for generating an angle error signal indicating the amount of the departure of the aircraft from the predetermined flight path, and further including means for generating said second angle signal as the function of an applied range signal, the various means in the system being susceptible to drift, an arrangement for compensating for the drift in the system during a preguidance period prior to the actual aircraft guidance operation, said arrangement comprising: first means including a precision delay device for producing a simulated range signal representing the range of a selected point on said flight path for a predetermined angle; second means associated with the angle error signal generating means for the system and operable during the preguidance period for producing a drift-indicating error signal as a function of the difference between said first and second angle signals; and a servo mechanism responsive both to a programming signal and to said drift-indicating error signal for adjusting said second means until the output signal produced by said angle error signal generating means is substantially zero.

6. The invention as defined in claim 5, wherein said flight path is the ideal glidepath of an approaching aircraft and said selected point is the touchdown point on said glidepath.

7. In a system wherein range and angle tracking is performed, the range of a target being indicated by a range signal produced as a function of the time displacement between system trigger signals and respective echoes representing the target, and the angle tracking being accomplished by computing a signal representing the proper angle which the target should have at the detected range for a prespecified movement, the computed angle signal being then compared with the actual scanning angle to produce an error signal indicating the displacement of the target from the desired prespecified movement; a pretracking calibration device for reducing the effect of system drift prior to the tracking operation, said device comprising: means for producing simulated target echoes occurring in time displacement with respect to corresponding trigger signals by an amount representing the range of a simulated target following the prespecified movement at a predetermined scanning angle; variable amplification means associated with the angle tracking means of the system, actuable to allow a variation in the amplitude of the error signal; and a servo mechanism operable during the pretracking calibration period, and responsive to the error signal, for controlling said amplification means so as to reduce the error signal to substantially zero, corresponding to a calibrated pretrack condition.

8. The device defined in claim 7 wherein said means for simulating target echoes includes a first circuit for delaying the system trigger signals for a period proportionate to the range in the prespecified movement to produce delayed signals, a second circuit responsive to the delayed signals and to an applied control signal indicating when the antenna scans in the direction of a point in the prespecified movement.

9. The device defined in claim 7 wherein the means for producing simulated target echoes includes the employment of radar transceiver and a reflector system spaced a predetermined distance from said transceiver.

10. The invention as defined in claim 9, wherein said reflector system comprises two electromagnetic wave reflectors disposed equidistant from said predetermined point and at a distance from said transceiver equal to the distance from said transceiver to said point.

11. In an automatic ground-controlled approach system where an aircraft is to be tracked after it is detected to pass through a predetermined search range, the system having a radar transceiver and range tracking means, the combination comprising: first means coupled to the range tracking means for generating simulated aircraft echoes positioned in time to represent the distance from the scanning station to a point on a predetermined flight path; second means for producing a range-simulating control signal having an amplitude passing through the boundaries surrounding the range of said predetermined point; and third means for applying said control signal to the range tracking means to actuate the range tracking means into a pretracking operation where its output range signal represents the range of said predetermined point.

12. The invention as defined in claim 11, wherein said control signal decreases at a first predetermined average rate when the amplitude of said control signal is without said boundaries and at a second predetermined average rate when the amplitude of said control signal is within said boundaries, said first rate being substantially greater than said second rate.

13. The invention as defined in claim 11, wherein the amplitude of said control signal decays exponentially with time.

14. The invention as defined in claim 11, wherein fourth means are provided to selectively couple the range tracking means from said first means to said radar transceiver.

15. In a ground controlled approach system including an angle tracking circuit for producing an output signal indicative of the error difference between the actual and desired angular position of an aircraft being tracked, the combination comprising an output signal amplifier coupled to the tracking circuit for producing an adjusted output error signal proportional to the error difference, said amplifier having variable bias means, servo means for varying said bias means, and control means for selectively introducing a servo control signal to said servo means in response to said adjusted output error signal, whereby said servo means may reduce said adjusted output error signal to zero.

16. The invention as defined in claim 15, wherein said control means includes a chopper and a relay coupling said chopper to said amplifier.

17. The invention as defined in claim 15, wherein said servo means includes a potentiometer having a movable tap, and a motor connected to said tap for producing a movement thereof.

References Cited in the file of this patent

UNITED STATES PATENTS

| | | |
|---|---|---|
| 2,433,681 | Blumlein | Dec. 30, 1947 |
| 2,686,303 | Harrison | Aug. 10, 1954 |

UNITED STATES PATENT OFFICE
CERTIFICATE OF CORRECTION

Patent No. 2,924,819            February 9, 1960

Burton Cutler

It is hereby certified that error appears in the printed specification of the above numbered patent requiring correction and that the said Letters Patent should read as corrected below.

Column 4, line 20, for "ype" read -- type --; column 7, line 72, for "track" read -- tracker --; column 8, line 5, for "30" read -- 430 --; line 15, for "241" read -- 421 --; line 35, for "checker" read -- tracker --; column 11, line 19, for "potentiometers" read -- potentiometer --; line 66, for "guide" read -- glide --.

Signed and sealed this 2nd day of August 1960.

(SEAL)
Attest:

KARL H. AXLINE            ROBERT C. WATSON
Attesting Officer            Commissioner of Patents